(12) United States Patent
Newton

(10) Patent No.: US 7,445,021 B2
(45) Date of Patent: *Nov. 4, 2008

(54) CONSTANT FLOW VALVE

(75) Inventor: John R. Newton, Vero Beach, FL (US)

(73) Assignee: Global Agricultural Technology and Engineering, LLC, Vero Beach, FL (US)

(*) Notice: Subject to any disclaimer, the term of this patent is extended or adjusted under 35 U.S.C. 154(b) by 282 days.

This patent is subject to a terminal disclaimer.

(21) Appl. No.: 11/358,227

(22) Filed: Feb. 21, 2006

(65) Prior Publication Data

US 2006/0267403 A1 Nov. 30, 2006

Related U.S. Application Data

(60) Provisional application No. 60/664,299, filed on Mar. 22, 2005.

(51) Int. Cl.
*G05D 16/08* (2006.01)

(52) U.S. Cl. .............................. 137/505.41; 137/315.05

(58) Field of Classification Search ................. 137/494, 137/495, 505.41, 505.39, 315.04
See application file for complete search history.

(56) References Cited

U.S. PATENT DOCUMENTS

| | | | |
|---|---|---|---|
| 2,359,111 A * | 9/1944 | Hughes | 137/505.41 |
| 2,405,010 A * | 7/1946 | Bucknam | 137/505.42 |
| 2,639,194 A | 5/1953 | Wahlinr | |
| 2,746,471 A | 5/1956 | Cobb | |
| 2,960,109 A | 11/1960 | Wilson | |
| 3,229,714 A | 1/1966 | Raem | |
| 3,424,196 A | 1/1969 | Donner | |
| 3,557,831 A | 1/1971 | Katchka | |
| 3,643,685 A | 2/1972 | Hays | |
| 3,730,215 A | 5/1973 | Conery et al. | |
| 3,730,773 A * | 5/1973 | Graber | 137/505.41 |
| 3,746,036 A | 7/1973 | Du Bois et al. | |
| 3,782,410 A | 1/1974 | Steuby | |
| 3,872,884 A | 3/1975 | Busdiecker et al. | |
| 3,943,969 A | 3/1976 | Rubin et al. | |
| 3,948,285 A | 4/1976 | Flynn | |
| 4,074,694 A | 2/1978 | Lee | |
| 4,080,993 A | 3/1978 | Lind, Jr. | |
| 4,083,380 A | 4/1978 | Huber | |
| 4,197,995 A | 4/1980 | Campbell et al. | |
| 4,250,915 A | 2/1981 | Rikuta | |
| 4,416,301 A | 11/1983 | Brumm | |
| 4,437,493 A | 3/1984 | Okuda et al. | |

(Continued)

FOREIGN PATENT DOCUMENTS

CA 530611 9/1956

(Continued)

*Primary Examiner*—Stephen M Hepperle
(74) *Attorney, Agent, or Firm*—Gauthier & Connors LLP

(57) ABSTRACT

A regulating valve includes an outer housing comprised of a cap joined to a base. The housing is internally subdivided by a barrier wall into a head section and a base section, the latter being further subdivided by a modulating assembly into a fluid chamber and a spring chamber. An inlet and a 90° outlet in the cap communicate with the fluid chamber. Fluid at a variable pressure is admitted into the fluid chamber via the inlet, with the modulating assembly serving to maintain the fluid exiting the fluid chamber via the outlet at a substantially constant pressure.

1 Claim, 1 Drawing Sheet

U.S. PATENT DOCUMENTS

| | | |
|---|---|---|
| 4,508,140 A | 4/1985 | Harrison |
| 4,513,777 A | 4/1985 | Wright |
| 4,516,600 A | 5/1985 | Sturman et al. |
| 4,621,658 A | 11/1986 | Buezis et al. |
| 4,627,832 A | 12/1986 | Hooven et al. |
| 4,630,642 A | 12/1986 | Detweiler |
| 4,657,224 A | 4/1987 | Lattuada |
| 4,697,613 A | 10/1987 | Wienck |
| 4,729,762 A | 3/1988 | Doumenis |
| 4,796,660 A | 1/1989 | Bron |
| 4,838,305 A | 6/1989 | Reinartz et al. |
| 4,852,606 A | 8/1989 | Heneker |
| 4,867,198 A | 9/1989 | Faust |
| 5,137,522 A | 8/1992 | Bron |
| 5,234,025 A | 8/1993 | Skoglund et al. |
| 5,241,986 A | 9/1993 | Yie |
| 5,255,711 A | 10/1993 | Reeds |
| 5,303,734 A | 4/1994 | Eidsmore |
| 5,341,968 A | 8/1994 | Vandoninck |
| 5,383,489 A | 1/1995 | Golestan et al. |
| 5,524,670 A | 6/1996 | Castle |
| 5,529,090 A | 6/1996 | Golestan et al. |
| 5,597,012 A | 1/1997 | Moinard |
| 5,642,752 A | 7/1997 | Yokota et al. |
| 5,727,529 A | 3/1998 | Tuckey |
| 5,829,477 A | 11/1998 | Graham et al. |
| 5,988,211 A | 11/1999 | Cornell |
| 6,026,850 A | 2/2000 | Newton et al. |
| 6,209,578 B1 * | 4/2001 | Newton .................. 137/505.41 |

FOREIGN PATENT DOCUMENTS

| | | |
|---|---|---|
| DE | 37 06 579 A1 | 6/1988 |
| EP | 0 475 743 | 9/1991 |
| GB | 732 400 | 6/1955 |
| GB | 1 163 585 | 9/1969 |
| GB | 2006930 | 5/1979 |
| GB | 2 099 112 | 4/1982 |

* cited by examiner

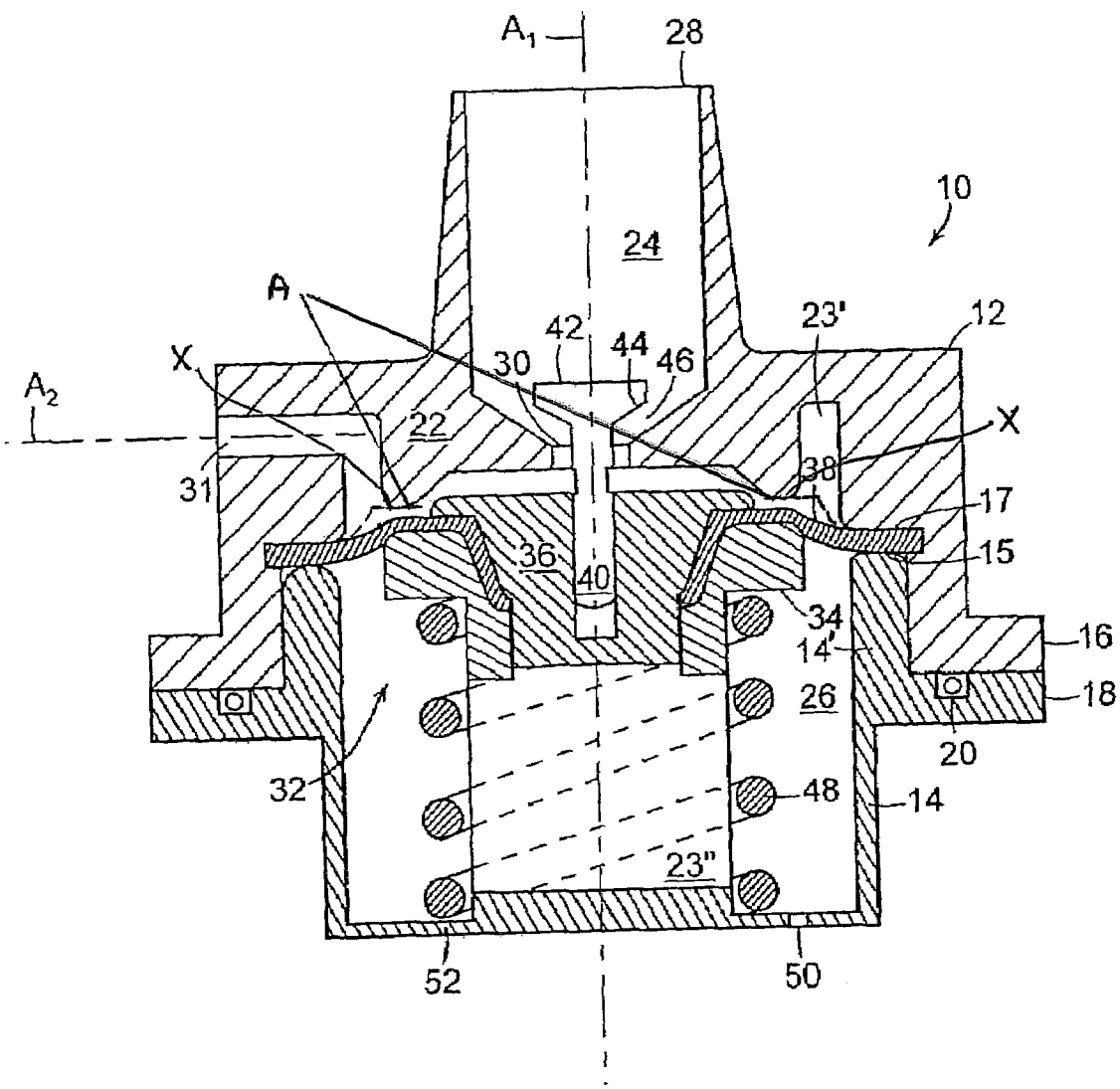

CONSTANT FLOW VALVE

CROSS REFERENCE TO RELATED APPLICATION

This application claims priority from Provisional Patent application Ser. No. 60/664,299 filed Mar. 22, 2005.

BACKGROUND OF THE INVENTION

1. Field of the Invention

This invention relates to generally to fluid valves, and is concerned in particular with a regulating valve that is normally closed, that is opened by a variable fluid pressure above a selected threshold level, and that when open, serves to deliver the fluid at a constant pressure and flow rate.

2. Description of the Prior Art

Regulating valves for the above-mentioned type are known, as disclosed for example in U.S. Pat. Nos. 6,026,850 and 6,209,578. While these known valves operate in an entirely satisfactory manner, for some uses, their design has proven to be overly complex, expensive, and difficult to incorporate in restricted spaces within fluid dispensing equipment, e.g., carbonated, and non-carbonated soft drink dispensers.

BRIEF DESCRIPTION OF THE DRAWING

The drawing is a sectional view through a regulating valve in accordance with the present invention, the valve being shown in its open condition.

DETAILED DESCRIPTION OF PREFERRED EMBODIMENT

With reference to the drawing, a regulating valve in accordance with the present invention is generally depicted at 10. The valve includes an outer housing having a cap 12 joined to a cup-shaped base 14 at mating exterior flanges 16, 18, with an O-ring seal 20 interposed therebetween.

The housing is internally subdivided by a barrier wall 22 into a head section 24 and a base section 26. An inlet 28 in the cap 12 is adapted to be connected to a fluid supply (not shown) having a pressure that can vary from below to above a threshold level. The inlet 28 and a central port 30 in the barrier wall 22 are aligned along a central axis $A_1$ of the valve. An outlet port 31, also in the cap 12, is aligned on a second axis $A_2$ transverse to the first axis $A_1$.

A modulating assembly 32 cooperates with the barrier wall 22 to subdivide the base section into a fluid chamber 23' segregated from a spring chamber 23". The modulating assembly serves to prevent fluid flow through the valve when the fluid pressure at the inlet 28 is below the threshold pressure. When the fluid pressure at the inlet exceeds the threshold pressure, the modulating assembly serves to accommodate fluid flow from the head section 24 through port 30 into chamber 23' at a constant pressure and flow rate, and from there through outlet port 31. Either the outlet port 31 or a downstream orifice or flow restrictor (not shown) serves to develop a back pressure in fluid chamber 23'.

The modulating assembly 32 includes a piston comprised of a hollow shell 34 and a central plug 36. The piston is supported for movement in opposite directions along axis $A_1$ by a flexible annular diaphragm 38. The inner periphery of the diaphragm is captured between the shell 34 and plug 36. The cup shaped base 14 has a cylindrical wall segment 14' received within the cap 12. The outer periphery of the diaphragm is captured between an upper rim 15 of the wall segment 14' and an inwardly projecting interior ledge 17 on the cap.

A stem 40 on the piston plug 36 projects through the port 30 into the head section 24. An enlarged head 42 on the stem has a tapered underside 44 that coacts with a tapered surface 46 of the barrier wall to modulate the size of the flow path through the port 30 as an inverse function of the varying fluid pressure in the input section, with the result being to deliver fluid to the outlet 31 at a constant pressure and flow rate.

A compression spring 48 in the spring chamber 23" is captured between an underside surface of shell 34 and the bottom wall 52 of the housing base 14. The spring urges the modulating assembly 32 towards the barrier wall 22. When the fluid pressure at the inlet 28 is below the threshold pressure, spring 48 serves to urge the diaphragm 38 against the barrier wall 22, thus preventing fluid flow from the fluid chamber 23' to the outlet 31'. As the fluid pressure exceeds the threshold pressure, the resilient closure force of spring 48 is overcome, allowing the piston assembly to move away from the barrier wall, and allowing the modulating function of the coacting tapered surfaces 44, 46 to commence. An opening 50 in the bottom wall 52 serves to vent the volume beneath diaphragm 38 to the surrounding atmosphere.

I claim:

1. A regulating valve for receiving fluid at a variable pressure from a fluid source and for delivering said fluid at a substantially constant pressure and flow rate to a fluid applicator or the like, said valve comprising:

a cup-shaped base having a cylindrical wall segment terminating in an upper rim, and an externally projecting first flange;

a cap having an inwardly projecting ledge and an externally projecting second flange, said cup-shaped base and said cap being configured and dimensioned for assembly as a unitary housing, with the cylindrical wall segment of said cup-shaped base inserted into said cap, and with the extent of such insertion being limited by the abutment of said first flange with said second flange to thereby provide a space between the upper rim of said cup-shaped base and the inwardly projecting ledge of said cap;

a barrier wall subdividing the interior of said housing into a head section and a base section;

a modulating assembly subdividing said base section into a fluid chamber and a spring chamber;

an inlet in said cap for connecting said head section to said fluid source;

a port in said barrier wall connecting said head section to said fluid chamber, said port being aligned with a central first axis of said valve;

an outlet in said cap communicating with said fluid chamber, said outlet being aligned on a second axis transverse to said first axis;

a stem projecting from said modulating assembly along said first axis through said port into said head section;

a flexible diaphragm supporting said modulating assembly within said housing for movement in opposite directions along said first axis, said diaphragm having an outer periphery captured in the space between the inwardly projecting ledge of said cap and a rim of the cylindrical wall segment of said cup-shaped base;

a spring in said spring chamber, said spring being arranged to resiliently urge said modulating assembly into a closed position at which said diaphragm is in sealing contact with said barrier wall to thereby prevent fluid flow from said head section via said port and fluid chamber to said outlet, said spring acting in concert with said modulating assembly and the stem projecting therefrom to modulate the size of said port as an inverse function of the variable fluid pressure in said input sections whereby the pressure and flow rate of the fluid delivered to said outlet is maintained substantially constant, said valve being automatically actuated when the pressure of the fluid acting on said modulating assembly exceeds a threshold level, and being automatically closed when said pressure drops below said threshold level.

* * * * *